July 3, 1962 R. L. WEIDA ET AL 3,042,902

INFORMATION LOCATION APPARATUS

Filed April 3, 1956 2 Sheets-Sheet 1

INVENTORS
ROBERT L. WEIDA
& EDGAR WOLF
BY S.C. Yuter
ATTORNEY

July 3, 1962 R. L. WEIDA ETAL 3,042,902

INFORMATION LOCATION APPARATUS

Filed April 3, 1956 2 Sheets-Sheet 2

INVENTORS
ROBERT L. WEIDA
& EDGAR WOLF
BY
S.C. Yuter
ATTORNEY

United States Patent Office
3,042,902
Patented July 3, 1962

3,042,902

INFORMATION LOCATION APPARATUS

Robert L. Weida, Whitestone, and Edgar Wolf, Bronx, N.Y., assignors, by mesne assignments, to Curtiss-Wright Corporation, Carlstadt, N.J., a corporation of Delaware Filed Apr. 3, 1956, Ser. No. 575,851
1 Claim. (Cl. 340—172.5)

This invention relates to storage devices of electronic data processors and more particularly to apparatus for locating information in the storage devices of electronic data processors.

Electronic data processors comprise four basic sections: the input-output section serving as a link between the remainder of the data processor and an operator, the arithmetic section for processing information, the storage section which serves as a "memory" or store for information, and the control section for sequencing the data processor through processing steps. These steps occur sequentially and are known as program steps or instructions.

A unit of information is usually transferred between the storage section and the arithmetic section during various steps of a processing operation. The unit of information, usually a predetermined number of numeric or alphabetic characters, is called a word of information. The storage section comprises a plurality of memory registers each capable of storing one word. Each of the memory registers contains a number of positions for storing the characters. Each position stores one character. Hence to store a word of a given number of characters, a memory register must contain that number of positions. Each position comprises at least one storage cell.

Most storage devices that serve as memories for data processors have many memory registers. For example, a rotating magnetic drum or disk storage device usually has a minimum of about one hundred memory registers. Each memory register is a fixed portion of a channel on the periphery of the rotating magnetic drum or disk. In a magnetic core matrix, each line of cores may constitute a memory register while each core in a line is a single storage cell. Other types of storage devices such as, acoustic delay lines, flip-flop registers, and cathode ray tubes also can be divided into a plurality of memory registers.

Since there are many memory registers in a storage device, a systematic means is necessary to locate a desired memory register so that information may be sent to or received from the arithmetic section.

Generally, the memory registers are systematically scanned. In a fairly common method of scanning, one memory register is designated as the first memory register and has associated with it a signal which initiates the scan operation. All of the remaining memory registers are assigned a number or address. An address generator then periodically generates these numbers in synchronism with the availability of each memory register.

To locate a particular memory register, a number representing the address of a desired memory register is entered into an address storage register. An output of the storage register is fed to one input station of a comparator while the numbers from the address generator are sequentially fed to a second input station. Comparisons are performed and when the numbers feeding both input stations are identical the desired memory register has been located.

Since the address storage registers and associated equipment are expensive, some data processors have eliminated this apparatus by substituting improved memory register location apparatus. In one instance a rotating magnetic storage device is coupled to a helical scanning member. The helical scanning member then scans a line of possible indicia positions on a program recording medium. Since the helical scanning member is coupled to the rotating magnetic storage device it is possible to locate memory registers by means of suitable indicia along a line on the program recording medium. A given indicia position always indicates the same memory register.

It is sometimes desirable to be able to select a particular memory register other than by indicia on the program recording medium.

It is therefore an object of the invention to provide improved apparatus for locating a desired memory register.

It is another object of the invention to provide improved address locating apparatus which is more economical than the systems using an address storage register and associated equipment.

It is a further object of the invention to provide improved memory register selecting apparatus which permits the selection of one memory register for a given step of a data processing program and permits the selection of a different memory register for the same step during a subsequent performance of the data processing program.

In accordance with the invention apparatus is provided for selecting an information storage register having a given number of information storage positions from a plurality of information storage registers in a data processor. Each of the storage registers has an associated designator position. Means are included for recording indicia in one or more of the designator positions of a designated storage register. The designator positions of all memory registers are then sensed for indicia. The detection of the indicia indicates the location of the designated information storage registers.

A feature of the invention is means for removing or deleting the indicia from the designator position after the indicia is sensed, thus restoring the designator position of the memory register to its initial state.

It should be noted that the apparatus of the invention may be used in a data processor in conjunction with a conventional address generator and comparator system. It also may be used in data processors having memory register selector apparatus such as the previously-described helical scan register location apparatus, which is described and claimed in the co-pending application of Samuel Lubkin, Serial No. 567,566, filed February 24, 1956, now Patent No. 2,945,213, dated July 12, 1960. The Lubkin patent, and a copending application of Evelyn Berezin, Serial No. 567,567, filed February 24, 1956, now Patent No. 2,973,141, dated February 28, 1961, disclose features of the invention disclosed and claimed herein.

An advantage of the present invention is that it is possible for an operator to choose a memory register by entering the address of the designator memory register. A control indicium is then inserted into the associated designator position of the memory register having the entered address. At a later time, the indicium is sensed and the contents of the associated memory register are processed. The indicium is then removed from the designator position and the same memory register will not be manually selected until another indicium is inserted in its associated designator position. Thus the contents of the memory register become available only when called for by the operator.

The advantage of such apparatus is apparent when information is to be inserted in a memory register by the operator during an input operation. In such an operation no separate storage apparatus need be provided to store the address of the memory register which will receive the information. The designated memory register is automatically tagged and awaits the receipt of the information to be stored.

Other objects, features and advantages will appear in the subsequent detailed description of the invention, wherein.

Figure 1:
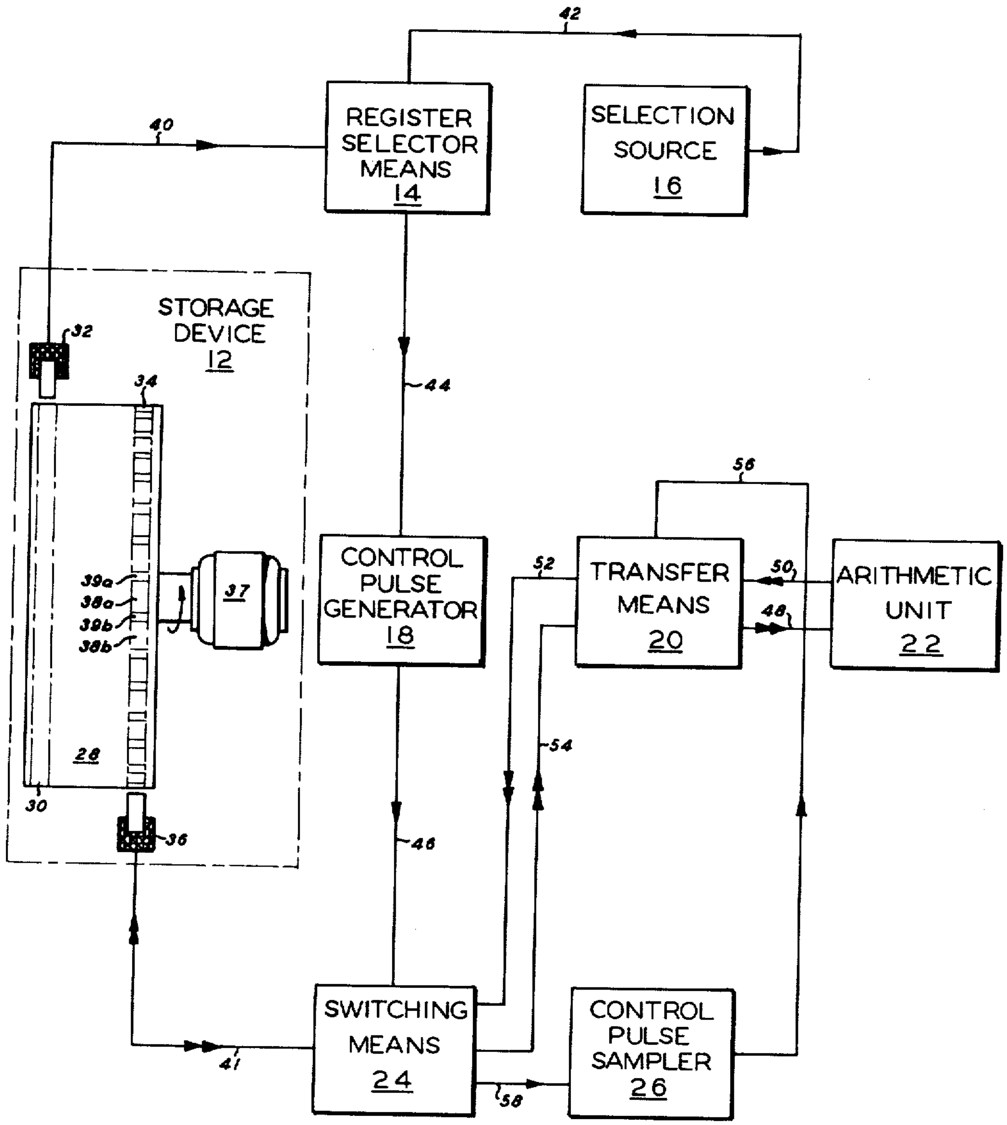
FIG. 1 shows in block diagram form apparatus for designating memory registers in accordance with the invention.

Referring to FIG. 1, apparatus in accordance with the invention is shown comprising storage device 12, register selector means 14, selection source 16, control pulse generator 18, transfer means 20, arithmetic unit 22, switching means 24, and control pulse sampler 26.

The storage device 12 includes a magnetic drum 28 which is rotated at a constant speed by motor 37. Other storage devices such as acoustic delay lines or magnetic core matrices may also be used. On the periphery of the magnetic drum 28 are two channels, a clock pulse channel 30 and a storage channel 34. The clock pulse channel 30 stores a fixed number of equi-spaced signals called clock pulses. The storage channel 34 has a plurality of memory registers 38 each capable of storing one word of information. Associated with each of the memory registers 38 is a designator position 39.

It should be noted that lines which carry control signals are designated by a single arrowhead while lines which carry information signals are designated by a double arrowhead.

The magnetic head 36 serves as a reading and recording head to read information from the storage channel 34 or record information in the storage channel 34. The magnetic head 36 is coupled to the switching means 24 via the line 41.

The selection source 16 is a device capable of receiving a number representing the address of a designated memory or storage register and of converting this number to a suitable signal pattern which represents the number. The selection source 16 is coupled to an input terminal of the register selection means 14 via the line 42.

The magnetic head 32 reads or reproduces the clock pulses from the clock pulse channel 30 and feeds them via the line 40 to another input of the register selector means 14.

The register selector means 14 may be a combination of a counter and a comparator. The register selector means 14 counts the number of clock pulses it receives via the line 40 and compares this count to the signals representing the address received via the line 42 from the selection source 16. When an equality occurs a signal is fed via the line 44 to the control pulse generator 18.

The control pulse generator 18 is a pulse generator which will generate a properly timed electrical waveform suitable for recording. The output terminal of the control pulse generator 18 is coupled via the line 46 to an input terminal of the switching means 24.

The arithmetic unit 22 may be any typical data processing circuit. The arithmetic unit 22 is coupled via the lines 48 and 50 to the transfer means 20. The line 50 serves as a transfer bus from the arithmetic unit 22 to the transfer means 20 while the line 48 serves as a transfer bus from the transfer means 20 to the arithmetic unit 22.

The transfer means 20 is gating circuitry which is activated by signals received via the line 56. The transfer means 20 is coupled to the switching means 24 by the lines 52 and 54. The line 52 acts as a transfer bus to transfer information from the transfer means 20 to the switching means 24. The line 54 acts as a transfer bus to transfer information from the switching means 24 to the transfer means 20.

The switching means 24 is a plurality of gating circuits which permit the transfer of information as electrical signals to the magnetic head 36 via the line 41 from either the control pulse generator 18 or the transfer means 20, and from the magnetic head 36 to the transfer means 20 or the control pulse sampler 26.

The control pulse sampler 26 receives signals from the switching means 24 via the line 58. These signals activate circuitry in the control pulse sampler 26 which will feed a pulse to the transfer means 20 via line 56 to permit the operation of the transfer means 20.

When a memory register is to be selected, the number or address of the memory register is set up in the selection source 16. The number may be set up by an operator typing the number on the typewriter or any standard input device. The selection source 16 converts the number to an electrical signal representation. The electrical representation is fed via line 42 to the register selector means 14. At the same time clock pulses are fed from the clock pulse channel 30 via the magnetic head 32 and the line 40 to the register selector means 14 where the clock pulses are counted. The count numbers correspond to the locations of the memory registers. When the count number bears a predetermined relationship to the address number fed from the selection source 16 a pulse is generated by the register selector means 14 and is fed via the line 44 to the control pulse generator 18. The control pulse generator 18 then generates a pulse which is fed via the switching means 24 and the line 41 to the magnetic head 36, and a signal is recorded in a particular designator position 39 on the channel 34 to tag or designate the desired memory register.

At a later time when the contents of the designated memory register are required all the signals recorded on the channel 34 are reproduced by the magnetic head 36 and fed via the line 41 to the switching means 24. The switching means 24 feeds all these signals to the control pulse sampler 26 via the line 58. The control pulse sampler 26 tests for signals that occur in the designator positions 39. When such a signal is detected the control pulse sampler 26 feeds a signal to the transfer means 20. The transfer means 20 then activates a gate which permits the passage of the contents of the designated memory register through the transfer means 20. If the information is to be processed then the transfer will be from the selected memory register 38 via the magnetic head 36 and the line 41 through the switching means 24, the line 54, the transfer means 20 to the arithmetic unit 22 via the line 48. If information in arithmetic unit 22 is to be stored the transfer is from the arithmetic unit 22 via the line 50 through the transfer means 20 to the switch means 24 via the line 52, to the magnetic head 36 via the line 41 to be recorded in the designated memory register.

Thus, in accordance with the invention, improved apparatus for locating a desired memory register has been provided which does not require an address storage register and associated equipment to store the desired address.

Figure 2:
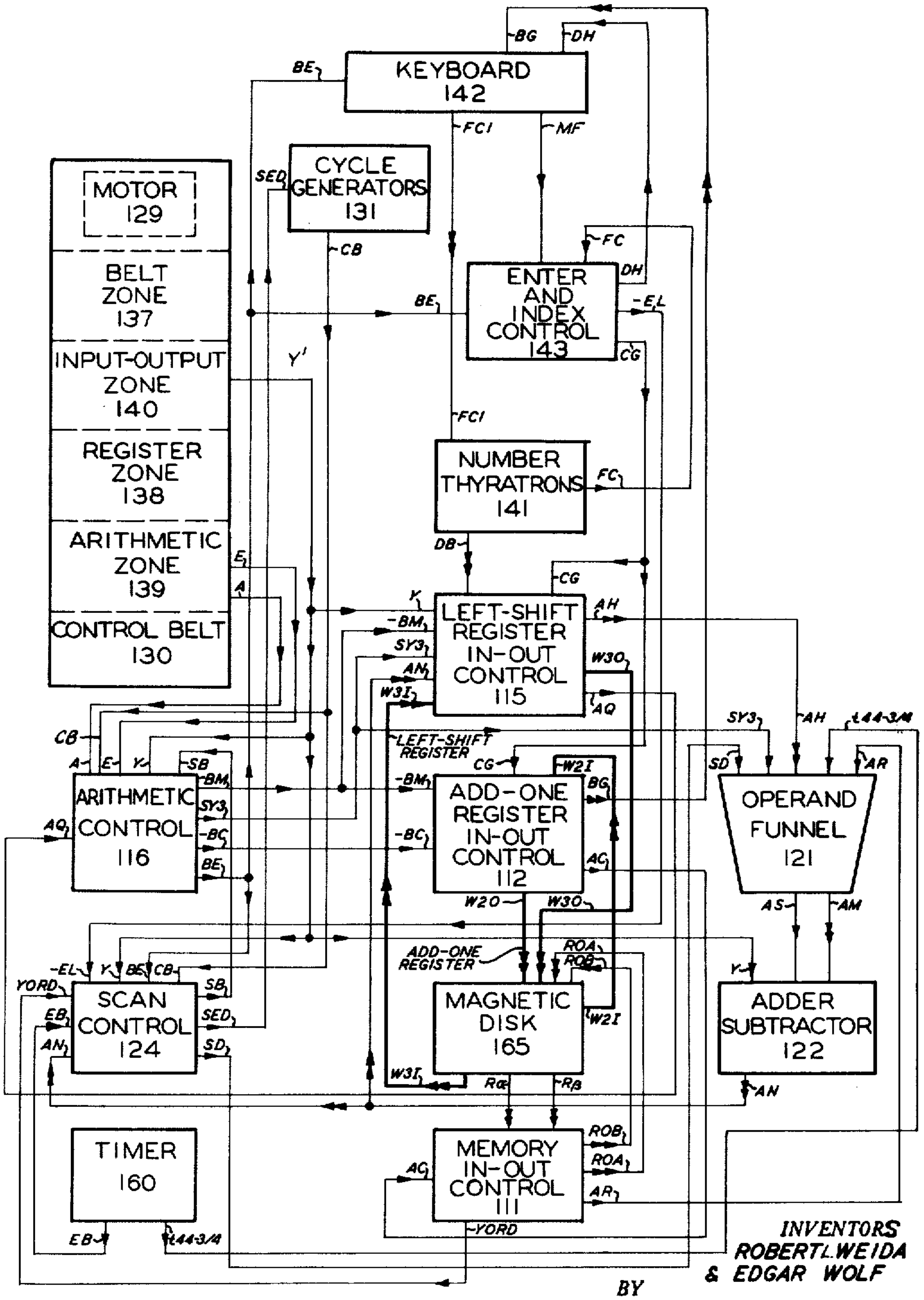
FIG. 2 shows an embodiment of the invention associated with the apparatus of a specific data processor.

Referring to FIG. 2 a specific embodiment of the invention is shown as part of the apparatus for a data processor which is described and claimed in the above-cited patent of Samuel Lubkin. This data processor or computer uses a control belt which generates the control signals for each step of a program. The control belt also contains holes which when sensed by an electrical scanning device generate signals which indicate the location of designated memory registers.

The computer system illustrated consists of the keyboard 142, the number of thyratrons 141, the control belt 130, the cycle generator 131, the enter and index control 143, the arithmetic control 116, the scan control 124, the timer 160, the left-shift register which includes block 115 and other elements hereinafter described, the add-one register which includes block 112 and other elements hereinafter described, the adder-subtractor 122, the operand funnel 121, the memory register in-out control 111, and the magnetic disk 165.

The keyboard 142 is primarily an input device. It comprises ten number keys by means of which numbers may be manually entered, motor bar keys for terminating entries in several ways, and circuitry which automatically terminates an entry.

The number thyratrons 141 serve as an encoder between the keyboard 142 and the remaining part of the computer system. Decimal digits typed in via the keyboard 142 are converted to binary coded pulse representation.

The control belt 130 is the central control of the computer. It includes a long plastic belt capable of movement in a forward or reverse direction together with apparatus for sensing indicia on the belt. It also includes a drive coupled to a stepping motor 129 which permits a controlled stepwise movement of the belt. The actual belt has arrays of hole positions oriented in lines perpendicular to the direction of motion. Opposite most of the hole positions are mechanical feelers which sense for holes to cause the generation of pairs of control signals of opposite polarity. The hole positions are divided into four zones. The belt zone 137 generates control signals which regulate movement of the control belt 130. The input-output zone 140 generates control signals which determine the input-output operations. The register zone 138 is serially scanned photoelectrically to generate signals which indicate particular memory registers. This is the only zone not employing mechanical feelers. The arithmetic zone 139 generates control signals for determining which arithmetic operations are to be performed.

The cycle generators 131 sequence the computer through the steps of a program instruction and sequence the computer from program instruction to program instruction.

The enter and index control 143 sequences the computer through the input and the output operations.

The arithmetic control 116 is primarily a static control register which sets up control signals that route and sequence the flow of information through the computer during arithmetic operations.

The scan control 124 is primarily a memory register gating control which functions in conjunction with the register designating signals from the register zone 138 of belt 130 and the YORD signal from the memory in-out control 111 to make the contents of memory registers available for processing.

The timer 160 generates repetitive signals from cycling units for synchronization, timing and waveform shaping throughout the computer.

The left-shift register comprises the left-shift register in-out control 115, the W3O signal line, a channel of the magnetic disk 165, and the W3I signal line. The left-shift register is used during input and output operations to permit digit by digit transfers to occur, and as a counting register during memory register selection operations.

The add-one register comprises the add-one register in-out control 112, the W2O signal line, a channel of the magnetic disk 165, and the W2I signal line. The add-one register is used as a counting register during input and output operations for counting the number of digits transferred, as a storage register for the multiplier during multiplication, and as a delay means during other arithmetic operations.

The adder-subtractor 122 is an arithmetic unit capable of serially adding and subtracting binary-coded decimal digits. The adder-subtractor 122 is described and claimed in the co-pending application of Evelyn Berezin and Phyllis Hersh, Serial No. 558,270, filed January 10, 1956, now Patent No. 2,943,790, dated July 5, 1960.

The operand funnel 121 selects from a plurality of sources the numbers to be fed to the adder-subtractor 122 as operands.

The memory register in-out control 111 acts as a gating control to shunt information between two channels of the magnetic disk 165 and other parts of the computer system.

The magnetic disk 165 has six channels each with appropriate magnetic recording and reproducing heads. Two channels are for storage; each storage channel can store up to fifty complete numbers. The storage space allotted to each number is called a memory register. Three channels are recirculation register channels, having their recording and reproducing heads arranged so that a delay in time of slightly less than one minor cycle (the time required for a complete number to pass a given point) occurs between reproducing and recording. Each of these recirculating registers is part of a working register. When the delay introduced by the external circuitry of the working register is added to the delay achieved by the magnetic head displacement a total delay of one minor cycle is obtained so that each working register can store one complete word.

The sixth channel carries a square wave recording used to generate clock pulses. The clock pulse signals are fed to the timer 160 to provide the synchronizing and timing signals for the computer. One pulse of the square wave is missing. Use is made of the absence of the pulse to synchronize the computer to the magnetic disk 165.

The schematic illustrations are usually arranged so that input lines enter at the left and top sides of each unit and output lines leave at the bottom and right sides of each unit.

The lines that connect the blocks which denote the basic units represent cables which may contain a plurality of wires through which electrical signals are transmitted. The flow of information signals is indicated by double arrowheads on the lines which represent the cables. The flow of control signals when shown is along lines designated by single arrowheads. The polarity of the various signals will not be indicated except where important.

The lines carrying the information and control signals have letter designations that are identical to the signal names.

Each of the units is more fully described in the above-cited patent of Samuel Lubkin.

In most cases the memory registers to be used by the computer in a program instruction are designated by fixed marks on the control belt 130. Therefore, once the control belt 130 is prepared the choice of memory registers is fixed. However, it is sometimes very convenient to have access to a memory register not designated by the control belt 130. Variable selection of memory registers can often decrease the number of program instructions required to process a quantity of information.

To provide added flexibility for the computer, program instructions are recorded on belt 130 to stop the computer until a memory register is designated for participation in a succeeding program step. This enables a use of any memory register in an operation without the need for permanently indicating any memory register on the control belt 130.

The exemplary program instruction permits the operator to choose a desired memory register by typing in the number indicating the memory register. Other input means such as paper tape apparatus could also be employed.

In the exemplary program instruction a number representing the desired memory register is manually set up and stored in the left-shift register.

After the number of the desired memory register is stored in the left-shift register, the computer advances to the next step, a scan cycle which is initiated by a marker associated with the first memory register and terminates with the second occurrence of the marker. Only during the scan cycle are the memory registers available to the computer. During the scan cycle a counting down operation in the left-shift register starts at the beginning of the scan cycle. It reduces the number in the register by one for each memory register as it passes under a reading head and terminates when the number stored in the left-shift register reaches the zero value.

The scan cycle is initiated by an EB signal (from timer 160) which indicates the availability of the 00 memory register (the first memory register) and each succeeding memory register becomes available a minor cycle later. Thus the memory register associated with the originally inserted number is available when the count reaches zero.

At this time, a mark is inserted in the designator portion of the contents of the memory register preceding the desired one. A final unit subtraction is performed which changes the zero to a minus one. The detection of the negative sign activates the terminating operations and the program instruction ends.

During the succeeding program instructions, the designator portions of each of the memory registers is tested and whenever a mark is detected a signal is generated which performs the same functions as a memory register designation mark permanently fixed on the control belt 130.

After the recorded mark is used to control selection of a memory register, it is erased. Hence the mark can only be used once and if further need for the memory register is required a new program step similar to the previous program instructions is required.

The program instruction of a memory register selection via a keyboard will now be described in detail. This program instruction is characterized by the A and E signals from the arithmetic zone 139 and the Y signal from input-output zone 140 of the control belt 130. The A and E signals fed to the arithmetic control 116 cooperate with a CB signal from the cycle generators 131 at the start of the program instruction to cause the generation of the BE signals. It should be noted that the BE signals are characteristic of entry operations. At the same time a —BM signal generated in the arithmetic control 116 clears the left-shift register and the add-one register.

The BE signal fed to the enter and index control 143 causes the generation of a DH signal which, fed to the keyboard 142, unlocks the keyboard. The BE signal is also fed directly to the keyboard 142 to alert the motor bars in the keyboard 142. Finally, a negative BE signal is fed to the scan control 124 to temporarily prevent the generation of an SB signal and thus stall the initiation of a scan cycle. The SB signal usually controls a scan cycle.

Two digits indicating the selected memory register are then sequentially entered via the keyboard 142 by the operator. Each digit (FC1 signal) is fed from the keyboard 142 for encoding by the number thyratrons 141 and transferred as the DB signals to the left-shift register via the left-shift register in-out control 115. As each digit is inserted, a CG signal is generated by the enter and index control 143 causing a one-digit left shift in the left-shift register. The CG signal is also fed to the add-one register in-out control 112 for activating a unit addition so that a count of the number of digits being inserted may be kept. After the insertion of the second digit, the add-one register stores a count of two. The count of two as represented by the BG signal is fed to the keyboard 142 where it simulates a normal end of entry motor bar action by causing the generation of the MF signal. The MF signal fed to the enter and index control 143 causes the generation of the EL signal. The EL signal during normal information entry operations causes the transfer of the contents of the left-shift register to the accumulator register via the adder-subtractor 122. However, in this program instruction the number is retained in the left-shift register because the Y signal fed from the input-output zone 140 to the left-shift register in-out control 115 overrides the memory transfer effects of the EL signal. A —EL signal is also fed to the scan control 124 to terminate the BE signal and the entry portion of the program instruction is completed.

With the disappearance of the BE signal the next EB signal from the timer 160 permits the generation of an SB signal and the initiation of the scan cycle. The SB signal in addition to performing some control functions is fed to the arithmetic control 116 causing the generation of the SY3 signals. The SY3 signals are characteristic of the counting down operation that is to be performed. The SY3 signal fed to the operand funnel 121 couples an output of the left-shift register as the AH signal to the adder-subtractor 122 as the AM signal. Also, the SY3 signal fed to the left-shift register in-out control 115 blocks normal recirculation of the contents of the left-shift register and couples the output of the adder-subtractor 122 as the AN signal to an input of the left-shift register. Thus, the contents of the left-shift register circulate through the adder-subtractor 122 instead of the normal recirculation path. In addition, the SY3 signal permits a $t44\frac{3}{4}$ signal from the timer 160 to enter via the operand funnel 121 the adder-subtractor 122 as an AS signal every minor cycle. A Y signal is fed to the adder-subtractor, and each minor cycle one is subtracted from the circulating number.

Constant sampling of the contents of the left-shift register is performed by an AQ signal fed from the left-shift register in-out control 115 to the arithmetic control 116. As long as the contents of the left-shift register are not zero, a —BC signal is generated by the arithmetic control 116. When the contents of the left-shift register become zero, the —BC signal is no longer generated in the arithmetic control 116. The absence of the —BC signal permits a single pulse to be generated in the add-one register in-out control 112. The single pulse is so timed as to be in the switching blank portion of the contents of the add-one register (designator position). The contents of the add-one register as the AC signal is fed to the memory in-out control 111 and the single pulse is then recorded in the switching blank preceding the memory register indicated by the original number that had been entered in the left-shift register.

A final unit subtraction is performed on the contents of the left-shift register, thus creating a negative number. The sign bit position of the contents of the left-shift register is fed via the adder-subtractor 122 as the AN signal to the scan control 124 causing the generation of an SED signal. The SED signal fed to the cycle generators 131 terminates the program instruction in the usual manner.

On the next program instruction the memory in-out control 111 tests the designator positions of all memory registers. When a pulse is found in a designator position a YORD signal is fed from the memory in-out control 111 to the scan control 124. The scan control 124 generates a gating signal SD lasting one minor cycle. The SD signal is fed to the operand funnel 121 permitting the contents of the designated memory register to be transferred as the AR signal from the memory in-out control 111 to the operand funnel 121. At the same time the memory in-out control 111 erases the signal from the designator position.

Thus improved apparatus has been shown in accordance with the invention for locating a desired memory register. The apparatus permits the selection of one memory register for a given step of a data processing program and permits the selection of a different memory register for the same step during a subsequent performance of the data processing program.

It will be evident from the foregoing that the invention is not limited to the specific circuit and arrangement of parts shown and disclosed herein for illustration but that the underlying concept and principle of the invention are susceptible of numerous variations and modifications coming within the broadest scope and spirit thereof as defined by the appended claim. The specification and drawings are accordingly to be regarded as an illustrative rather than a limiting sense.

What is claimed is:

In data processing apparatus including a cyclic memory having a plurality of data storage registers each having an associated designator portion, and means for permanently storing sequential steps of a principal data processing program to be performed by said apparatus together with the respective addresses of the data storage registers whose contents are to be processed as called for by respective program steps:

means for effecting address modification and program execution on the modified address, both during execution of the principal program and without substantial delay in the execution of the principal program, comprising:

(*a*) means for inserting into, and storing in the designator portion associated with a randomly desired storage register a single designator signal, (*b*) detecting means for subsequently probing said designator portions in sequence, (*c*) means responsive to the detection of the stored designator signal, for performing the data processing operation called for by the then effective permanently stored program step with respect to the register associated with such designator pulse rather than the register called for by said then effective permanently stored program step, and (*d*) means also responsive to the detection of the stored designator signal, for substantially simultaneously deleting the stored designator signal while retaining data in its associated register to permit future processing of such data and to permit subsequent execution of said then effective program step with respect to the storage register called for by such step rather than the register called for by said inserting means.

References Cited in the file of this patent

UNITED STATES PATENTS

| | | |
|---|---|---|
| 2,549,071 | Dusek | Apr. 17, 1951 |
| 2,721,990 | McNaney | Oct. 25, 1955 |
| 2,782,398 | West | Feb. 19, 1957 |
| 2,817,072 | Chien | Dec. 17 ,1957 |
| 2,916,210 | Selmer | Dec. 8, 1959 |